US012603546B2

US 12,603,546 B2

(12) United States Patent
Ekambaram et al.

(10) Patent No.: US 12,603,546 B2
(45) Date of Patent: Apr. 14, 2026

(54) CANNED MOTOR FOR ELECTRIC SUBMERSIBLE PUMP

(71) Applicant: Schlumberger Technology Corporation, Sugar Land, TX (US)

(72) Inventors: Raju Ekambaram, Singapore (SG); You Cheng Jee, Singapore (SG); Stanislav Konstantinovich Ivanov, Singapore (SG); Maxim Y. Radov, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 210 days.

(21) Appl. No.: 18/685,687

(22) PCT Filed: Aug. 25, 2022

(86) PCT No.: PCT/US2022/041530
§ 371 (c)(1),
(2) Date: Feb. 22, 2024

(87) PCT Pub. No.: WO2023/028233
PCT Pub. Date: Mar. 2, 2023

(65) Prior Publication Data
US 2024/0356404 A1 Oct. 24, 2024

(30) Foreign Application Priority Data
Aug. 25, 2021 (SG) ............................ 10202109299U

(51) Int. Cl.
*H02K 5/128* (2006.01)
*H02K 5/16* (2006.01)
(Continued)

(52) U.S. Cl.
CPC ............... *H02K 7/08* (2013.01); *H02K 5/161* (2013.01); *H02K 15/14* (2013.01); *H02K 5/1285* (2013.01); *H02K 7/083* (2013.01)

(58) Field of Classification Search
CPC ...... H02K 5/128; H02K 5/1282; H02K 5/125; H02K 5/132; H02K 5/161; H02K 5/1672;
(Continued)

(56) References Cited

U.S. PATENT DOCUMENTS 3,663,847 A * 5/1972 Schaefer ................ H02K 5/167
310/90
5,003,210 A * 3/1991 Liu ........................ H02K 5/167
310/90
(Continued)

OTHER PUBLICATIONS

Search Report and Written Opinion issued in Singapore Patent Application No. 10202109299U dated Apr. 23, 2024, 11 pages.
(Continued)

*Primary Examiner* — Eric Johnson
(74) *Attorney, Agent, or Firm* — Kyle R. Miiller

(57) ABSTRACT

A canned motor for a submersible pump system and a method of manufacturing the canned motor are provided. The canned motor includes: a canned stator comprising a can disposed within a central bore of a lamination stack, wherein an inner diameter of the can comprises at least one keyway; and a rotor bearing comprising at least one key configured to engage the keyway of the can when a shaft and rotor sub-assembly is disposed within the canned stator.

21 Claims, 14 Drawing Sheets

(51) Int. Cl.
  *H02K 7/08* (2006.01)
  *H02K 15/14* (2025.01)
(58) Field of Classification Search
  CPC ...... H02K 5/1732; H02K 15/13; H02K 15/14;
       H02K 15/144; H02K 5/1285; H02K 7/08;
         H02K 7/083; E21B 43/128
  See application file for complete search history.

(56) References Cited

U.S. PATENT DOCUMENTS

| | | |
|---|---|---|
| 7,239,056 B1 | 7/2007 | Griggs |
| 2004/0155740 A1 | 8/2004 | Nussio |
| 2015/0256043 A1 | 9/2015 | Perisho |
| 2016/0312591 A1* | 10/2016 | Pyron ................... F04D 13/062 |
| 2018/0152074 A1* | 5/2018 | Head ......................... E21B 4/04 |
| 2018/0171767 A1* | 6/2018 | Huynh ..................... H02K 7/14 |
| 2018/0195554 A1* | 7/2018 | Parmeter .............. F16C 23/043 |
| 2018/0248439 A1 | 8/2018 | McGrew, Jr. |
| 2020/0158116 A1 | 5/2020 | Esberger |
| 2020/0274416 A1* | 8/2020 | Wrighton .............. H02K 5/132 |

OTHER PUBLICATIONS

Search Report and Written Opinion of International Patent Application No. PCT/US2022/041530 issued Dec. 9, 2022; 13 pages.

* cited by examiner

CANNED MOTOR FOR ELECTRIC SUBMERSIBLE PUMP

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a national stage entry under 35 U.S.C. § 371 of International Application No. PCT/US2022/041530, filed Aug. 25, 2022, which claims priority benefit of Singapore Application No. SG 10202109299U, filed Aug. 25, 2021, the entirety of which is incorporated by reference herein and should be considered part of this specification.

BACKGROUND

Field

The present disclosure generally relates to electric submersible pumps, and more particularly to canned motor architectures.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

SUMMARY

In some configurations, a motor for a submersible pumping system includes a housing; a canned stator comprising: a lamination stack and stator windings; and a can disposed within a central bore of the lamination stack and disposed adjacent an inner diameter of the lamination stack, an inner diameter of the can comprising at least one keyway; a shaft and rotor sub-assembly comprising: a shaft; at least one rotor disposed about the shaft; and at least one rotor bearing disposed about the shaft, the at least one rotor bearing comprising at least one key configured to engage the keyway of the can when the shaft and rotor sub-assembly is disposed within the canned stator.

The motor can further include encapsulation material disposed between the housing and the can. The at least one rotor bearing can include an upper rotor bearing disposed proximate an upper end of the lamination stack, a lower rotor bearing disposed proximate a lower end of the lamination stack, and at least one intermediate rotor bearing disposed between the upper and lower rotor bearings.

The canned stator can include a sealing mechanism at each axial end of the can to prevent fluid entry into the lamination stack. The sealing mechanism can include at least one port configured to allow wires from the motor to extend therethrough for external connections. The sealing mechanism can include one or more of welding, adhesive(s), elastomeric sealing elements, and metallic sealing elements.

The motor can further include a compensator unit coupled to the motor. The compensator unit includes a compensation bellow. Wires can extend from the motor, within the compensator unit along an outer diameter of the bellow, to a downhole gauge.

In some configurations, a method of manufacturing a motor for a submersible pumping system includes inserting a can into a central bore of a stator, the stator comprising a lamination stack disposed within a housing; and inserting a shaft and rotor sub-assembly into a central bore of the can, the shaft and rotor sub-assembly comprising at least one rotor disposed about a shaft and at least one rotor bearing disposed about the shaft.

The method can further include sealing interfaces between an outer diameter of the lamination stack and an inner diameter of the housing and between an inner diameter of the lamination stack and an outer diameter of the can. The method can include passing wires from the motor, through a sealing mechanism at or near a bottom of the motor, to extend to a downhole gauge.

The method can further include at least partially filling a space between the housing and the can with encapsulation material. The method can include pre-forming at least one keyway along an inner surface of the can prior to assembly with the lamination stack and housing. Alternatively, the method can include forming, e.g., hydroforming, at least one keyway along an inner surface of the can after inserting the can into the central bore of the stator. The method can further include aligning and engaging the keys of the rotor bearings with the keyways in the inner surface of the can.

The at least one rotor bearing can include an upper rotor bearing disposed proximate an upper end of the lamination stack, a lower rotor bearing disposed proximate a lower end of the lamination stack, and at least one intermediate rotor bearing disposed between the upper and lower rotor bearings.

The method can further include coupling a compensator unit to the motor, the compensator unit comprising a compensation bellow. The method can include filling an area outside the bellow with dielectric oil The method can include routing wires from the motor, within the compensator unit along an outer diameter of the bellow, to a downhole gauge. The compensation unit can include communication ports open to the well bore, allowing well fluid to enter an area inside the bellow to provide pressure equalization between the ESP motor and the wellbore.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
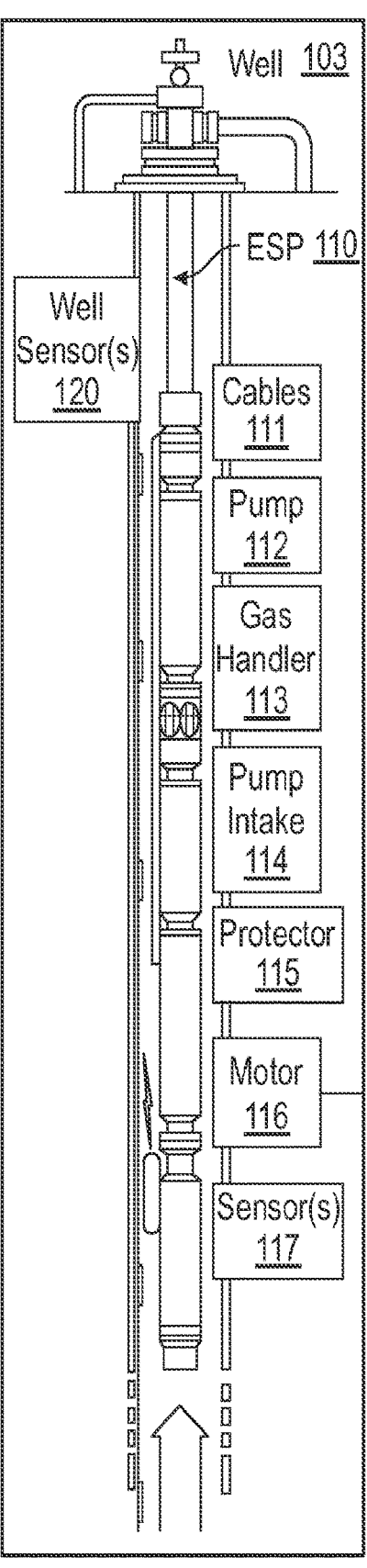
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well may include one or more well sensors 120.

The pump 112 includes multiple centrifugal pump stages mounted in series within a housing. Each stage includes a rotating impeller and a stationary diffuser. A shaft extends through the pump 112 and is operatively coupled to the motor 116. The shaft can be coupled to the protector 115 (e.g., a shaft of the protector), which in turn can be coupled to the motor 116 (e.g., a shaft of the motor). The impellers are rotationally coupled, e.g., keyed, to the shaft. The diffusers are coupled, e.g., rotationally fixed, to the housing. In use, the motor 116 causes rotation of the shaft (for example, by rotating the protector 115 shaft, which rotates the pump shaft), which in turn rotates the impellers relative to and within the stationary diffusers.

In use, well fluid flows into the first (lowest) stage of the ESP 110 and passes through an impeller, which centrifuges the fluid radially outward such that the fluid gains energy in the form of velocity. Upon exiting the impeller, the fluid makes a sharp turn to enter a diffuser, where the fluid's velocity is converted to pressure. The fluid then enters the next impeller and diffuser stage to repeat the process. As the fluid passes through the pump stages, the fluid incrementally gains pressure until the fluid has sufficient energy to travel to the well surface.

The motors of submersible pumping systems typically include a stator secured within a tubular housing and a rotor secured to a power transmission shaft that rotates within the stator. The rotor typically is made up of a number of rotor sections, the number of rotor sections depending upon the length and power rating of the motor. The rotor sections are spaced apart from each other, and a rotor bearing assembly is located between each rotor section. Each rotor section is connected to the shaft so that all of the rotor sections rotate as the shaft rotates. The motor can be a permanent magnet synchronous motor or an AC induction motor.

Each rotor bearing assembly within a rotor section acts to support the shaft and to maintain it in proper axial alignment. A rotor bearing assembly comprises a sleeve connected or keyed to the shaft so that the sleeve and shaft rotate together, and a journal (e.g., bearing, bushing) disposed coaxially around the sleeve. The journal may be configured to engage the inner wall of the stator to prevent the journal from rotating and to maintain proper alignment of the shaft.

The present disclosure provides a canned motor, for example for a submersible pumping system, and methods of manufacturing or assembling such a canned motor. The canned motor can include a hermetically sealed stator, which may be encapsulated. In some configurations, canned motors according to the present disclosure include a plurality of rotor bearings, including rotor bearings positioned at intermediate locations along the shaft, for example between rotor sections and between upper and lower ends of the stator. The sealed stator includes a can disposed along and forming an inner diameter or surface of the sealed stator. An inner diameter or surface of the can includes a keyway configured to receive a corresponding key of the rotor bearings.

Figure 2A:
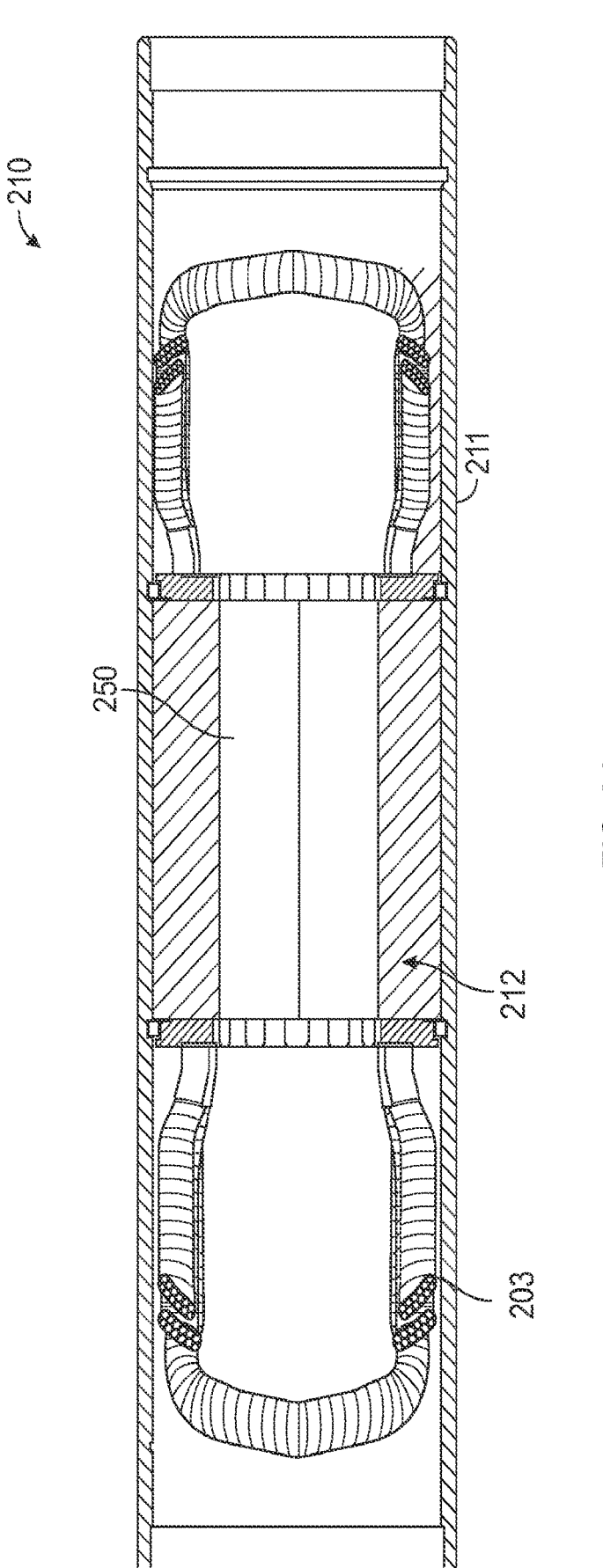
FIG. 2A shows a stator.
Figures 2B, 2C:
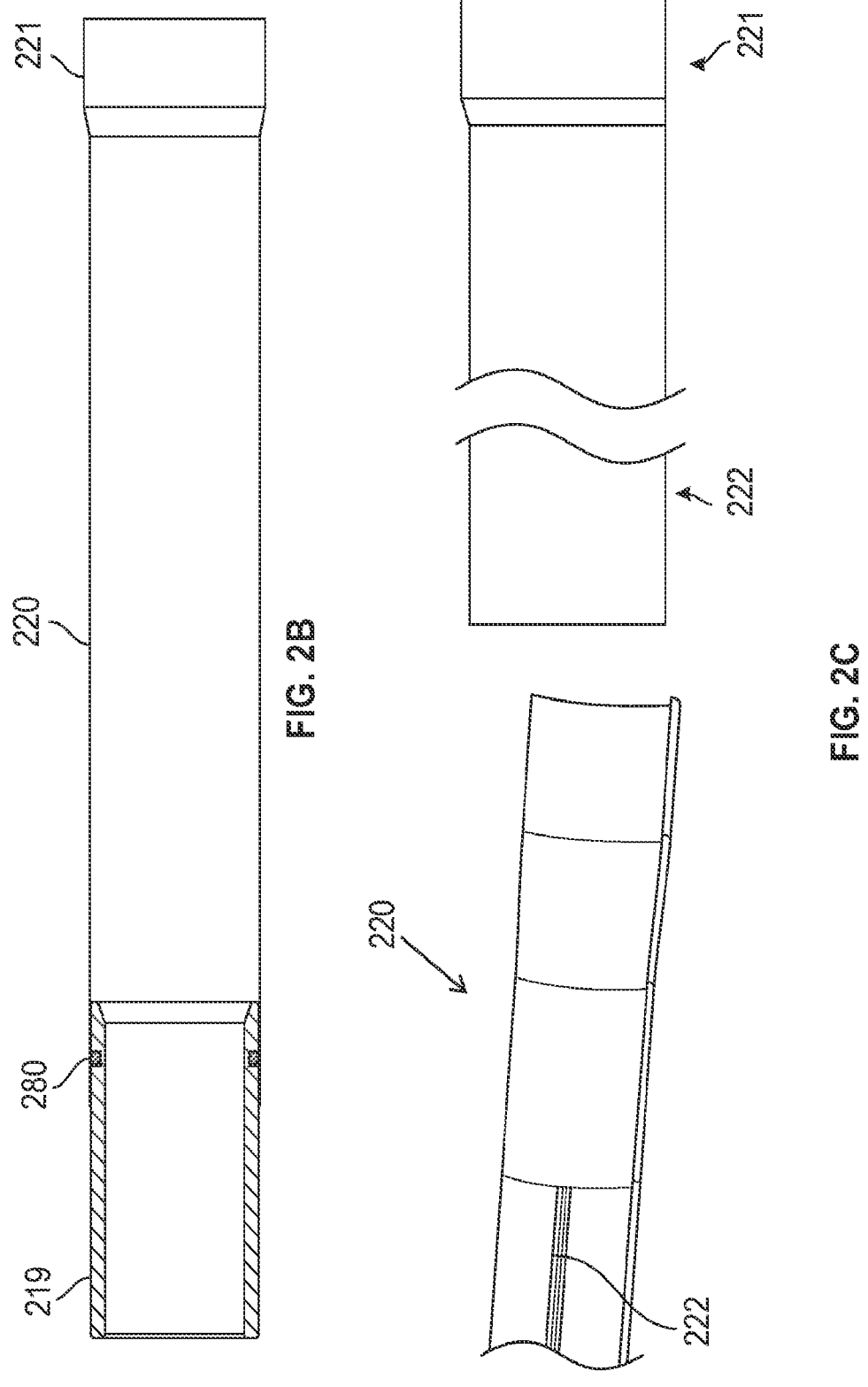
FIG. 2B shows a can sub-assembly.
FIG. 2C shows examples of cans having a pre-formed keyway and without a pre-formed keyway.
Figures 3A, 3B:
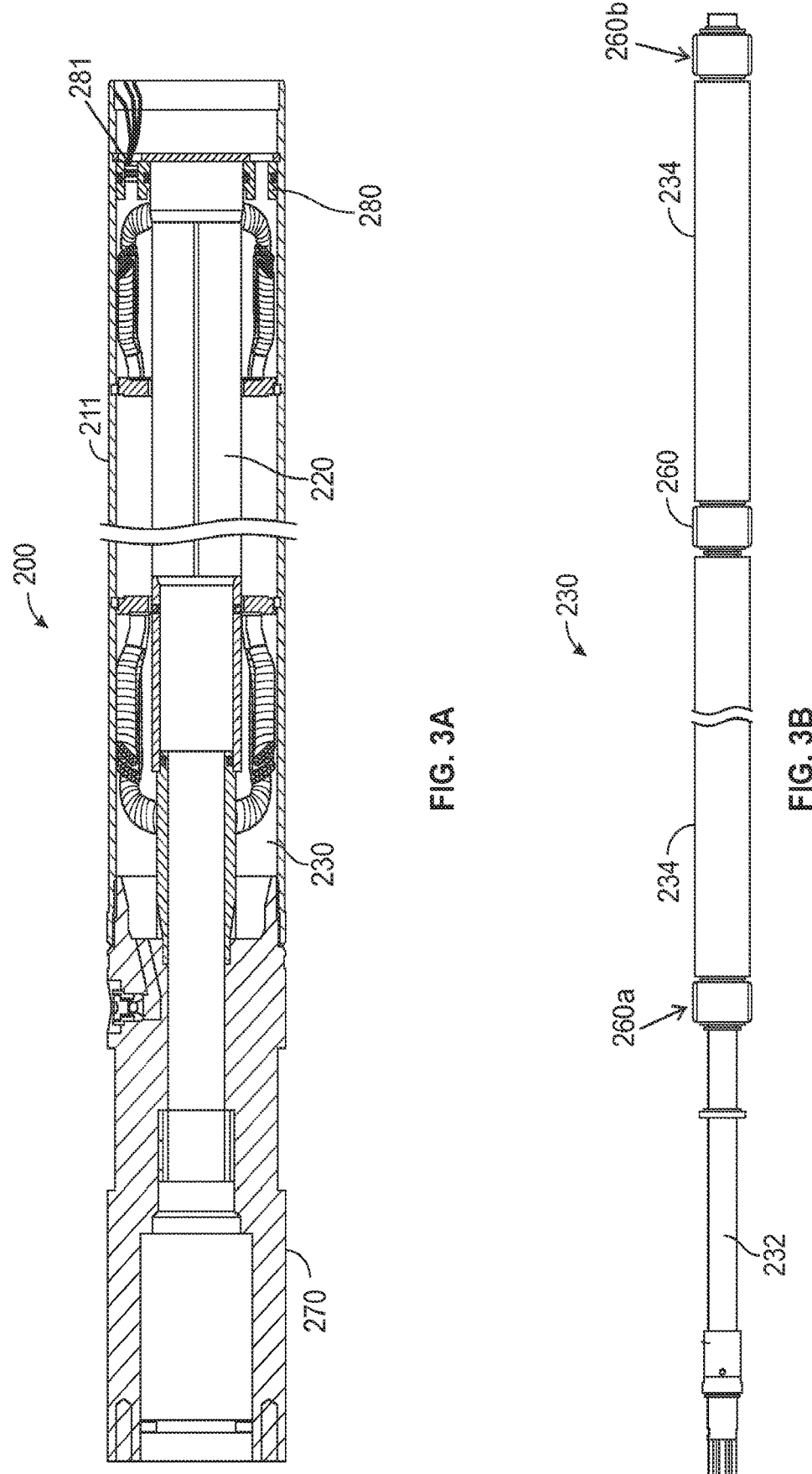
FIG. 3A shows a cross-section of a canned stator, including the stator of FIG. 2A and can of FIG. 2B.
FIG. 3B shows a shaft-rotor sub-assembly.
Figure 3C:
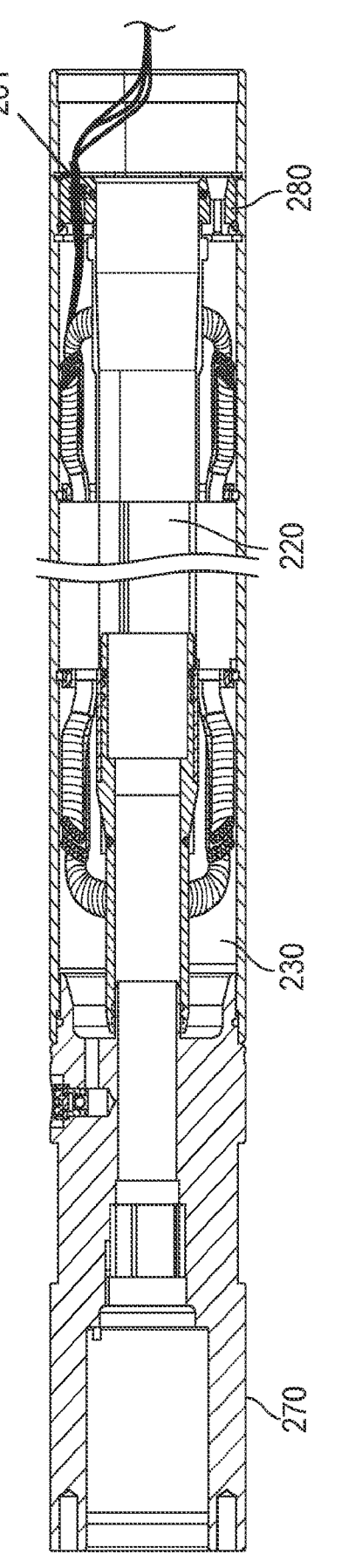
FIG. 3C shows a cross-section of another example of a canned stator.

To assemble a canned motor according to the present disclosure, a can sub-assembly 220, shown in FIGS. 2B and 2C, is inserted into a central bore 250 of a wound stator 210, shown in FIG. 2A. An upper end of the can 220 can form a flange end 219. In some configurations, the can 220 includes an expanded lower end 221. The wound stator 210 includes a lamination stack 212, including a plurality of stator laminations 214, disposed within a housing 211. The canned stator 200 can be sealed at or near each end via one or more various sealing mechanisms 280 to prevent fluid entry into the lamination stack 212. For example, interfaces between an outer diameter of the lamination stack 212 and an inner diameter of the housing 211, and between the inner diameter of the lamination stack 212 and an outer diameter of the can 220 can be sealed to form a hermetically sealed canned stator 200, as shown in FIG. 3A. Such sealing can be accomplished via, for example, welding, adhesives, elastomeric and/or metallic sealing elements, some combination thereof, or other appropriate sealing means. Stator windings can extend through slots of the stator laminations 214 and form end coils 203 at the axial ends. As shown in FIG. 3A, available space between the housing 211 and the can 220 can be filled with encapsulation material 230. The hermetically sealed stator 200 is advantageously tolerant to well fluid or water ingress, which improves the reliability of the motor 116.

Figure 6:
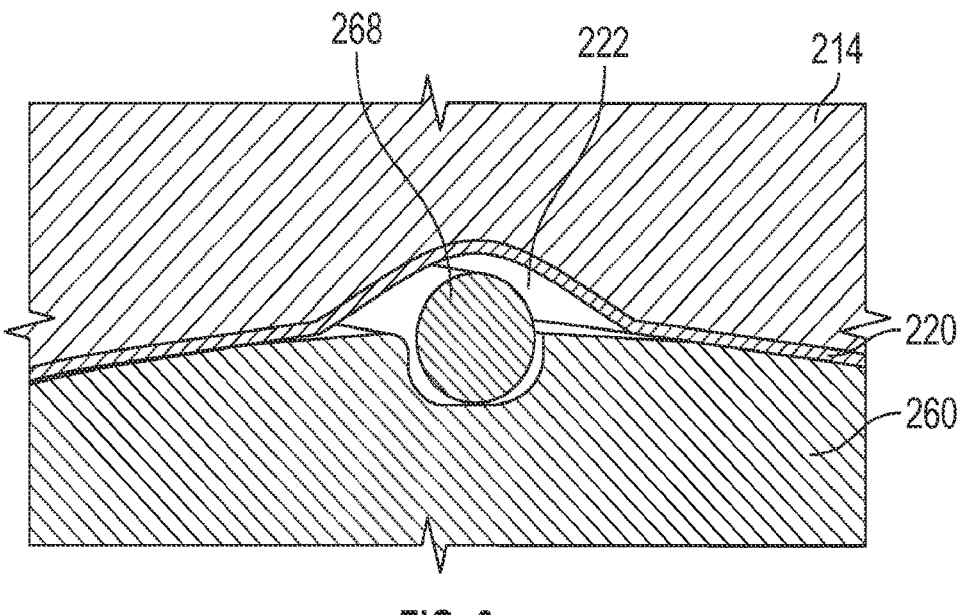
FIG. 6 shows a close-up view of a portion of the canned motor of FIG. 4, showing a key of a rotor bearing engaged with a keyway of the can.

As shown in, for example, FIG. 6, the can 220 includes a recessed keyway 222. In some configurations, the inner diameter or surface of the stator laminations 214 includes a keyway, and the can 220 follows the profile of the inner surface of the lamination stack 212, including the keyway of the laminations 214, as shown in FIG. 6. The keyway 222 can have various shapes or curvatures (e.g., transverse cross-sectional shapes or curvatures), such as square or circular. The keyway 222 can extend along an entire length or axis of the can 220 or of the stator 200 or lamination stack 212, or may only extend along portions of the length of the stator 200 in the location or area of the rotor bearings 260 when assembled.

The keyway 222 can be pre-formed in the can 220 prior to assembly (e.g., prior to inserting the can 220 into the lamination stack 212) as shown on the left of FIG. 2C. Alternatively, the can 220 may not include a pre-formed keyway 222, as shown on the right of FIG. 2C. The keyway 222 can be formed, e.g., hydroformed, in-situ after the can 220 is assembled into the stator bore 250. Hydroforming can advantageously enable keying of one or more intermediate rotor bearings, which would otherwise be problematic. The design of the present disclosure uses the stator laminations 214 directly as the mold for the hydroforming process of the thin walled can 220. This advantageously eliminates intermediate steps of transferring a hydroformed can into the motor stator, which could damage the can 220. This also advantageously provides an improved fit between the can 220 and the stator.

FIG. 3B shows a shaft-rotor sub-assembly 230. The shaft-rotor sub-assembly 230 includes a shaft 232, one or more rotor sections 234 disposed about the shaft 232, and one or more rotor bearings 260. The rotor sections 234 can be keyed to the shaft 232 via one or more shaft keys 233. As shown, a top rotor bearing 260a can be disposed on top of the rotor (e.g., proximate or adjacent an upper end of an uppermost rotor section 234), a bottom rotor bearing 260b can be disposed at the bottom of the rotor (e.g., proximate or adjacent a lower end of a lowermost rotor section 234), and one or more rotor bearings 260 can be disposed at intermediate locations along the shaft 232 between the top and bottom rotor bearings, for example, between consecutive rotor sections 234.

Figure 5A:
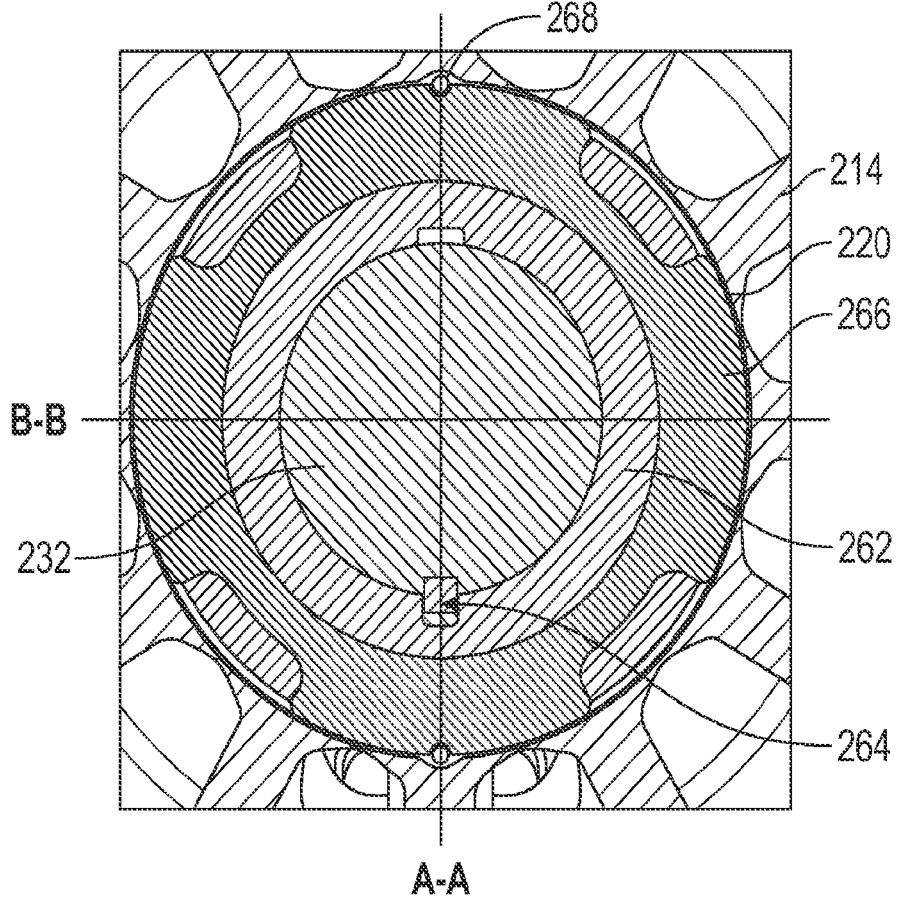
FIG. 5A shows a transverse cross-section of the canned motor of FIG. 4A.
Figure 5B:
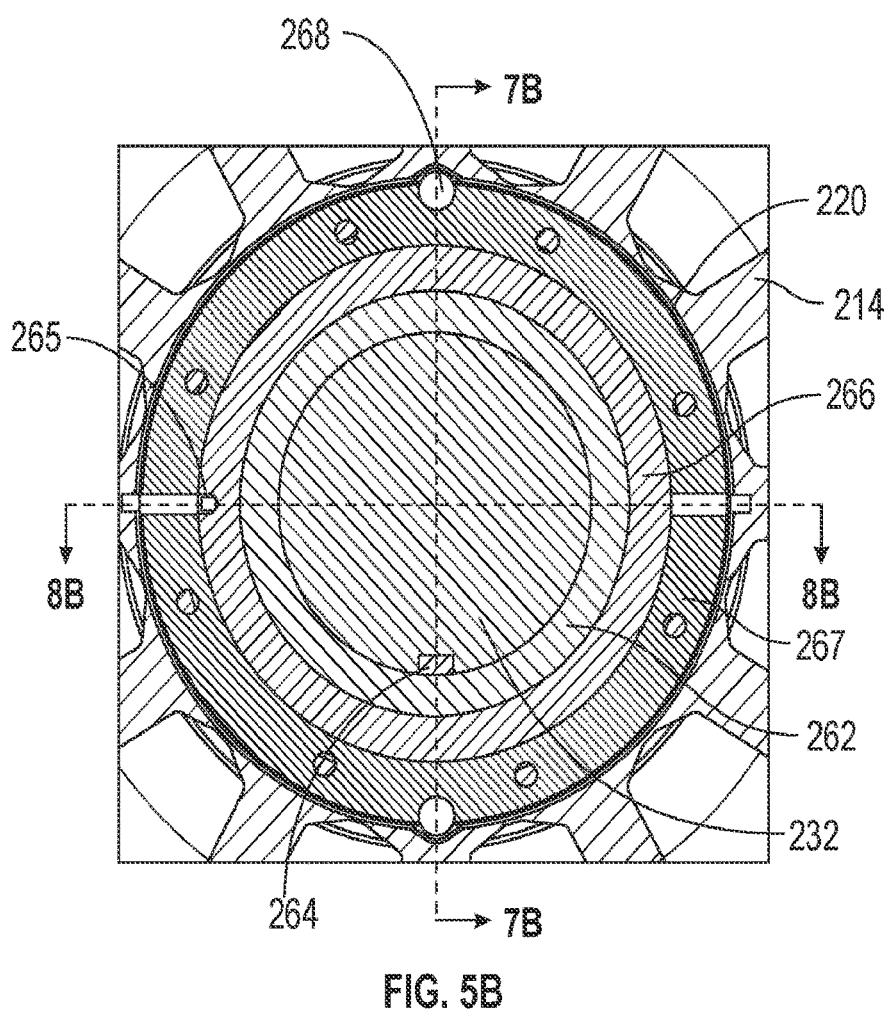
FIG. 5B shows a transverse cross-section of the canned motor of FIG. 4C.
Figure 7A:
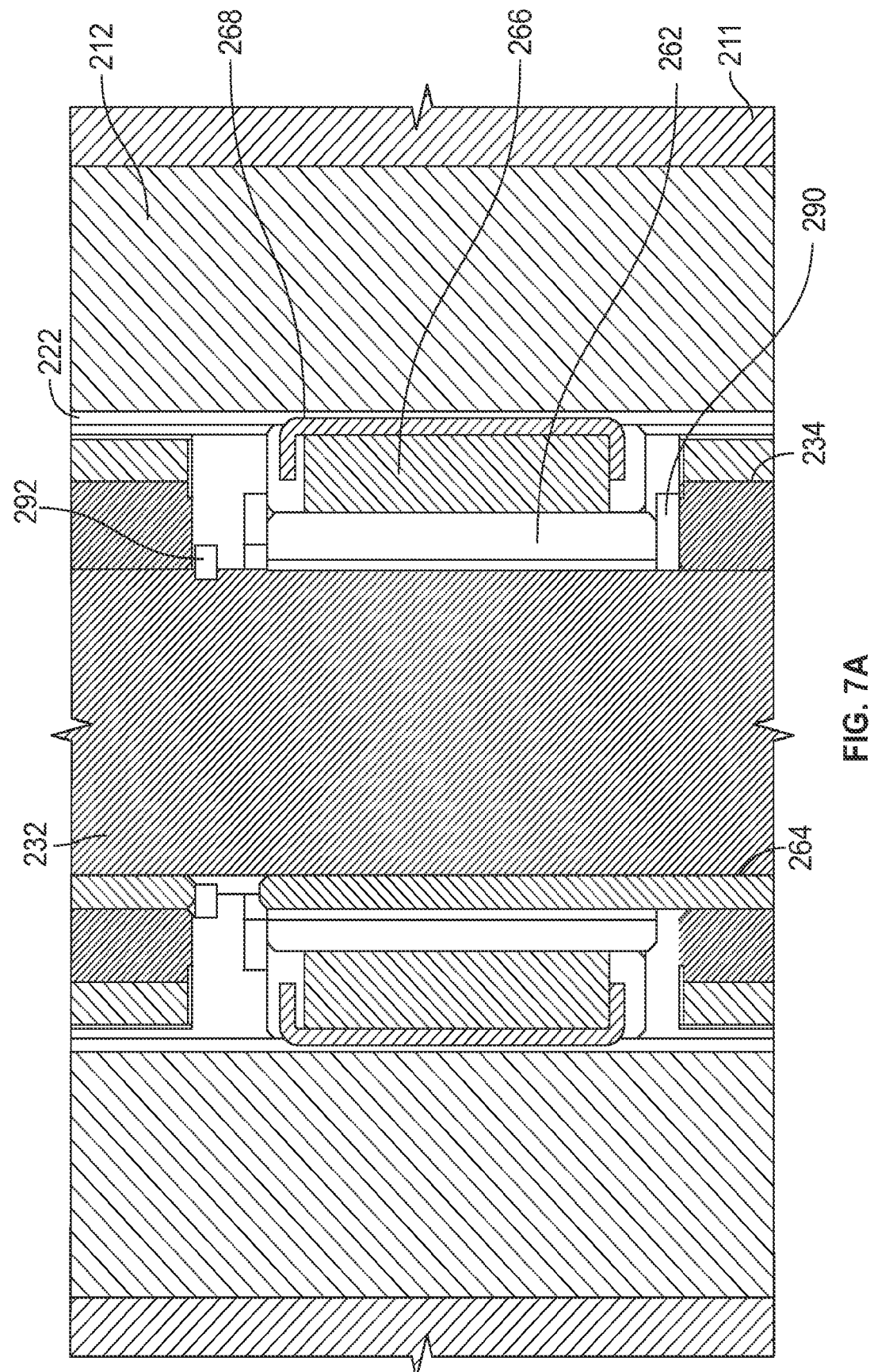
FIG. 7A shows a longitudinal cross-sectional view of the canned motor of FIG. 4A, taken along line A-A shown in FIG. 5A.
Figure 7B:
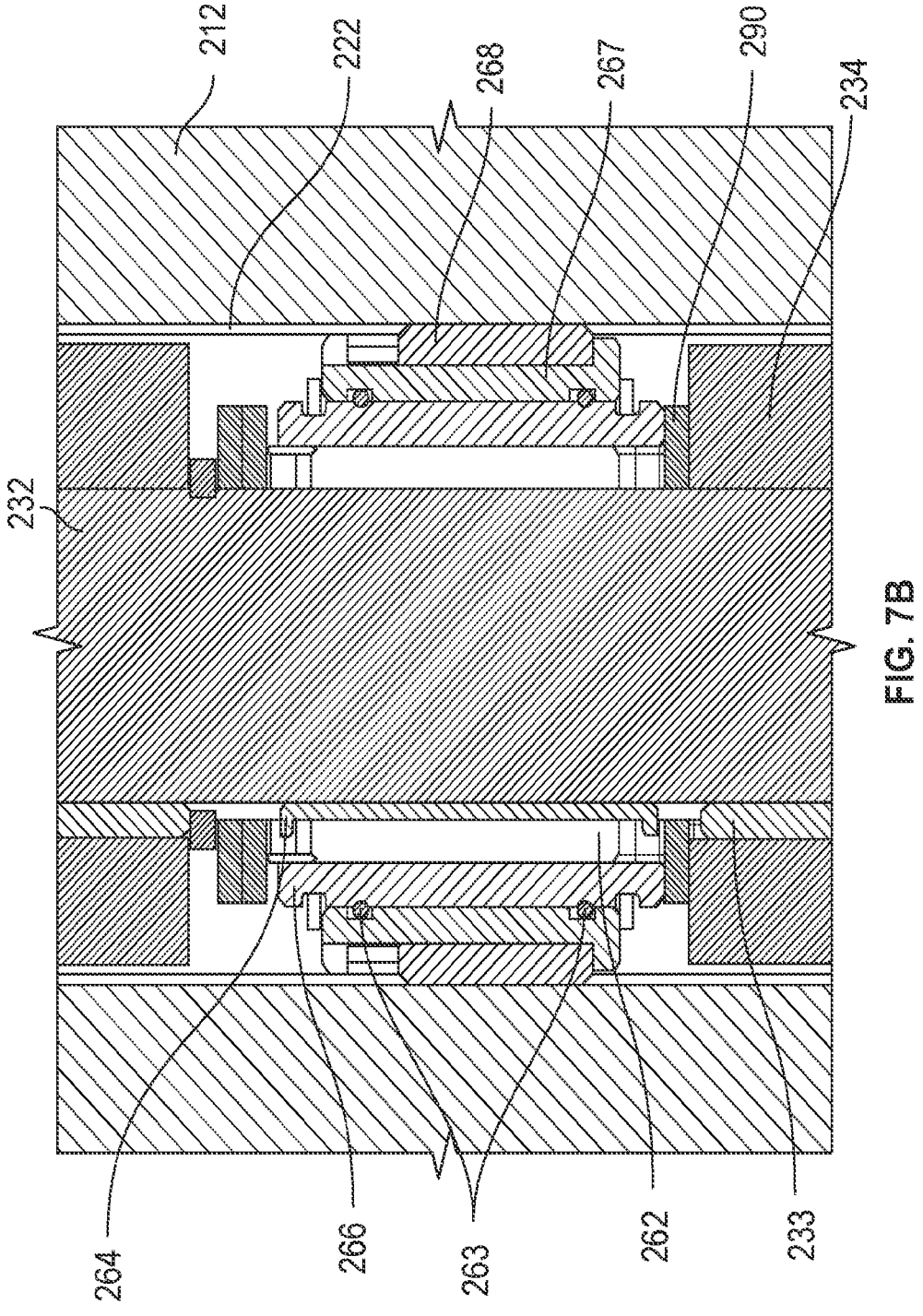
FIG. 7B shows a longitudinal cross-sectional view of the canned motor of FIG. 4C, taken along line A-A shown in FIG. 5B.
Figure 8A:
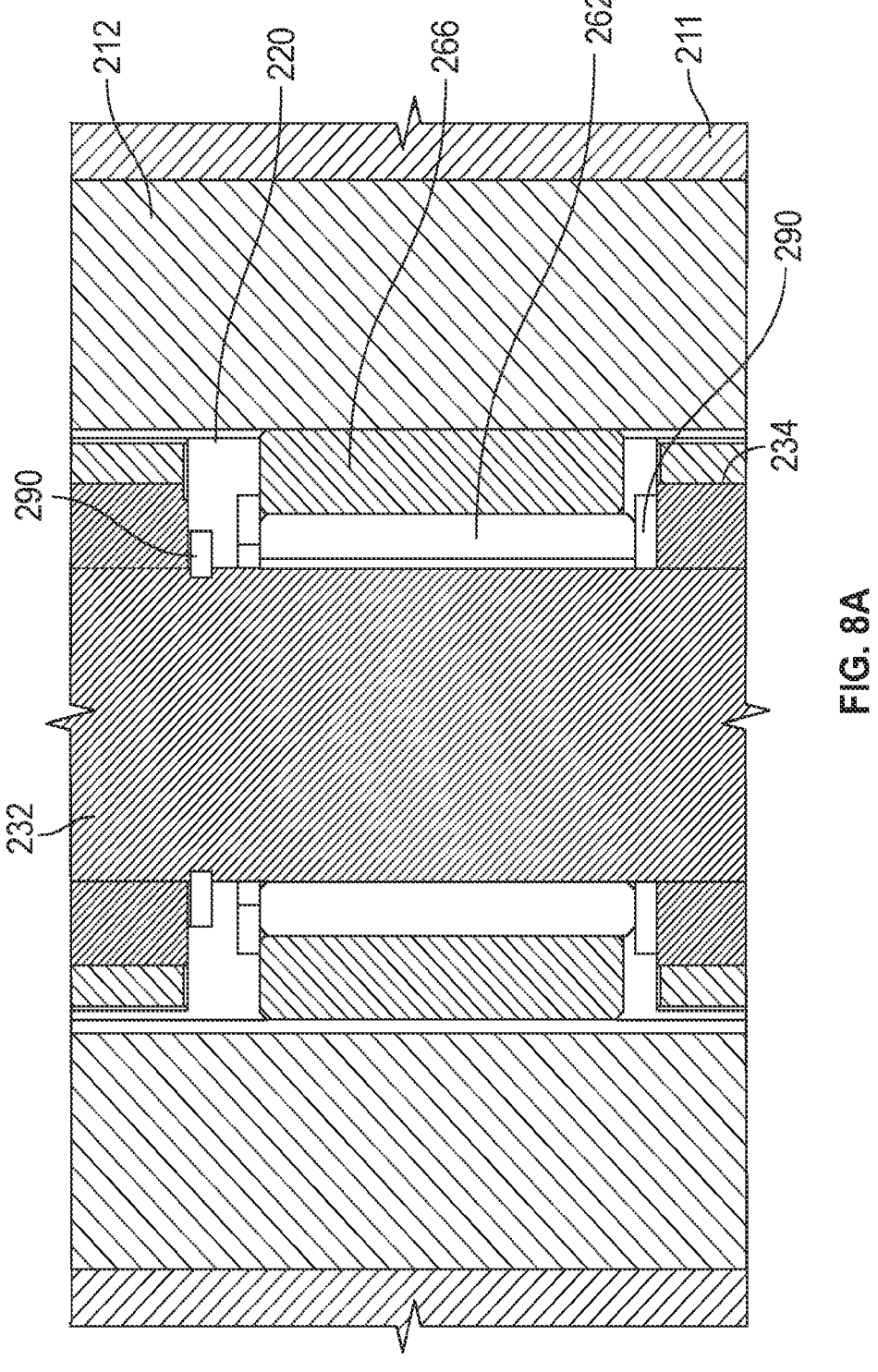
FIG. 8A shows a longitudinal cross-sectional view of the canned motor of FIG. 4A, taken along line B-B shown in FIG. 5A.
Figure 8B:
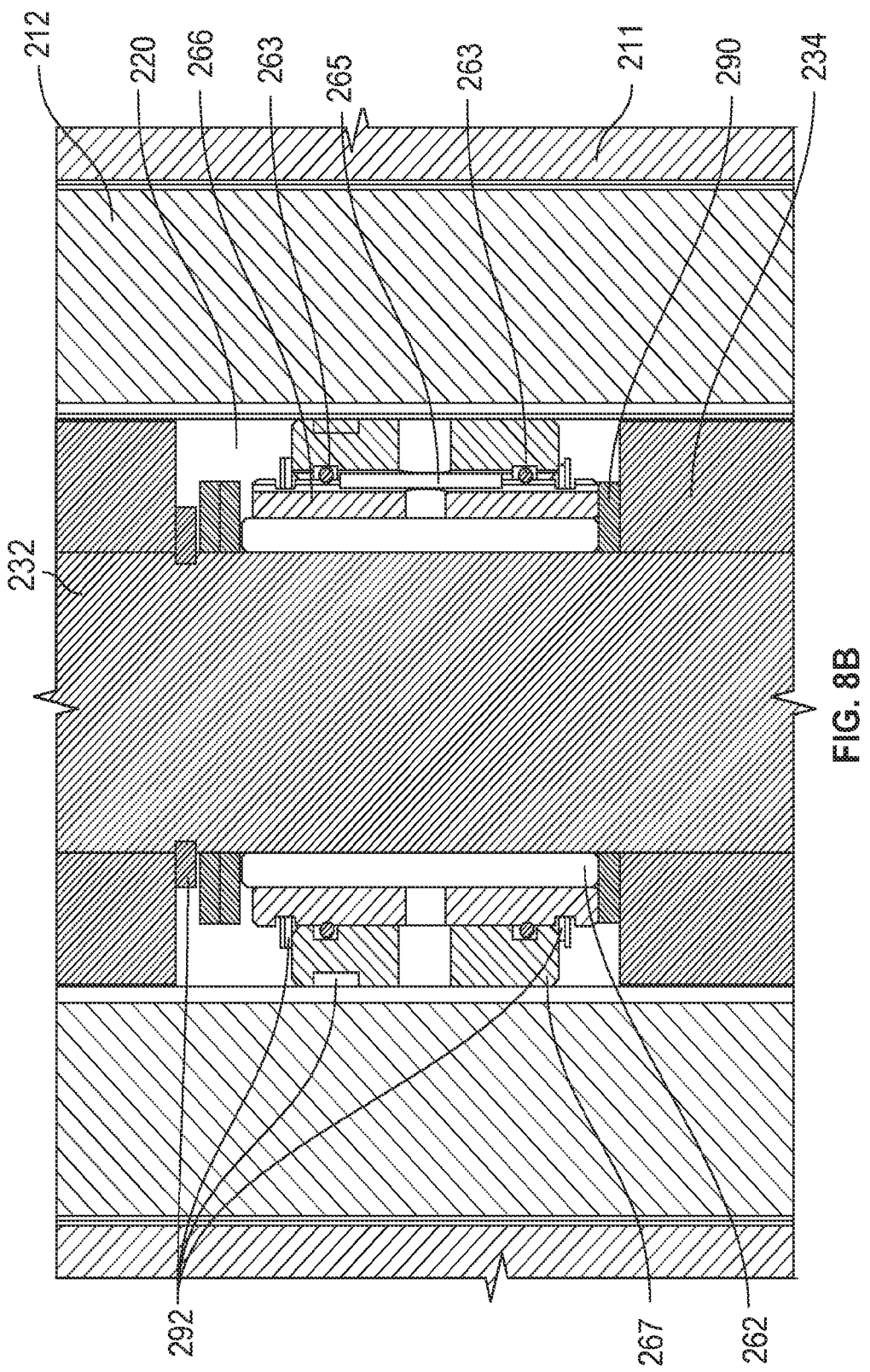
FIG. 8B shows a longitudinal cross-sectional view of the canned motor of FIG. 4C, taken along line B-B shown in FIG. 5B.

Each rotor bearing 260 includes a bearing sleeve 262, which is keyed to the shaft 232, for example via a shaft key 264, as shown in FIGS. 5A-5B and 7, a rotor bearing bushing 266 disposed circumferentially about and co-axial to the bearing sleeve 262, and a rotor bearing key 268. In some configurations, the rotor bearing key 268 is disposed on or about a radially outer surface of the rotor bearing bushing 266 or at least partially in a channel or groove formed in the radially outer surface of the rotor bearing bushing 266, as shown in FIG. 5A. In some configurations, for example as shown in FIG. 5B, the rotor bearing 260 includes a rotor bearing metallic carrier 267 disposed circumferentially about the bushing 266, and the rotor bearing key 268 is disposed on our about a radially outer surface of the carrier 267, for example, at least partially in a channel or groove formed in the radially outer surface of the carrier 267. A bushing anti-rotation key 265 can key or rotationally fix the bushing 266 to the carrier 267. One or more compliant bushing mounts 263 can be disposed radially between the bushing 266 and the carrier 267. A thrust washer 290 can be disposed axially between the rotor bearing 260 and the lower adjacent rotor section 234. A snap ring or retaining ring 292 may be disposed axially between the rotor bearing 260 and the upper adjacent rotor section 234.

At least a portion of the rotor bearing key 268 can extend longitudinally or axially parallel to the shaft 232. In some configurations, for example as shown in FIG. 7A, top and bottom end portions of the rotor bearing key 268 can be bent, for example at 90°, to help secure the rotor bearing key 268 to the rotor bearing bushing 266. The key 268 can be of a fixed type, which may require pre-alignment (before assembly of the shaft-rotor sub-assembly 230 with the canned stator) with the keyway 222 to properly engage the keyway 222. Alternatively, the key 268 can be a spring-loaded key, which may not require pre-alignment.

Figures 4A, 4B:
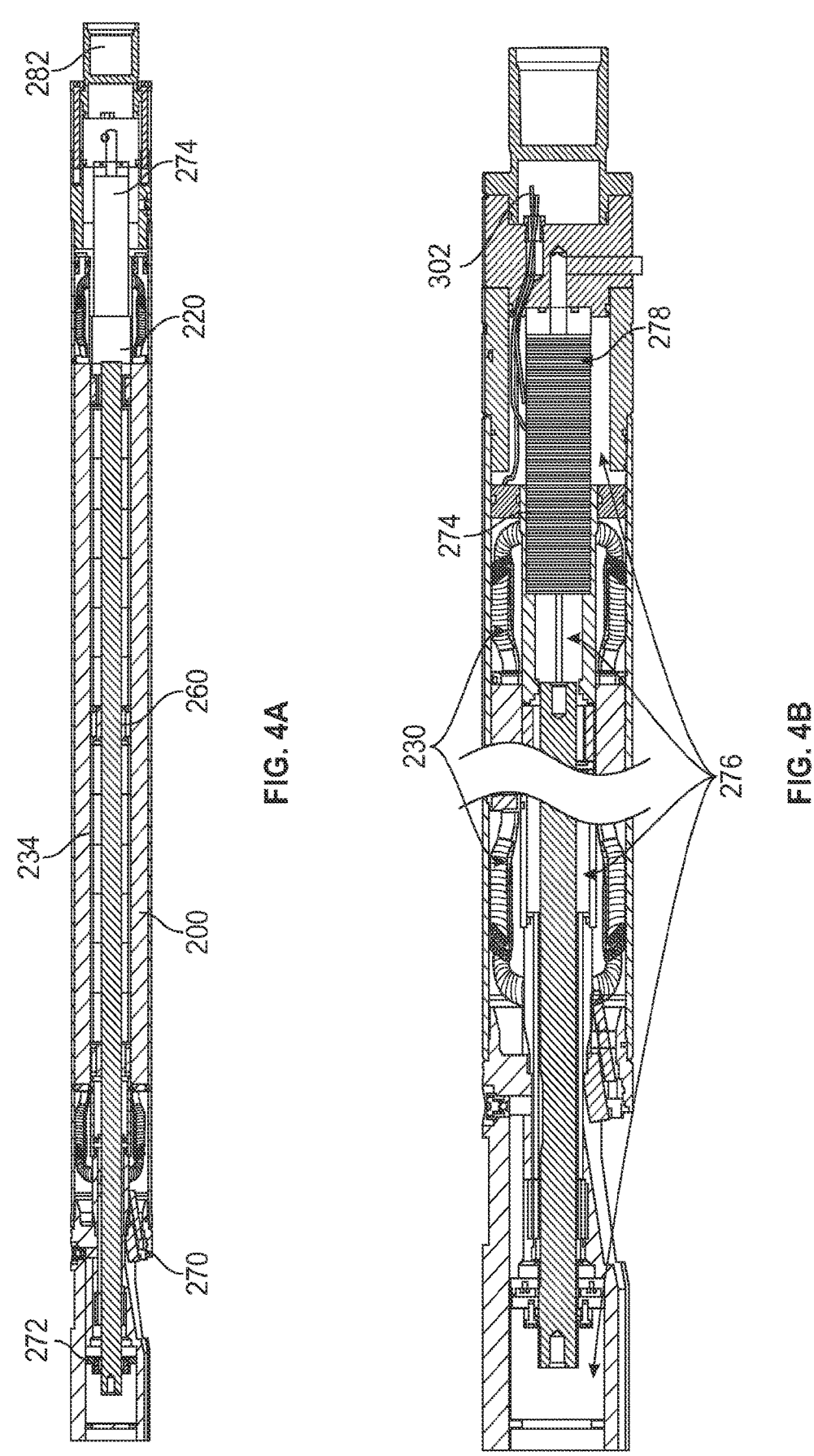
FIG. 4A shows an assembled canned motor, including the canned stator of FIG. 3A and shaft-rotor sub-assembly of FIG. 3B.
FIG. 4B shows areas of the canned motor of FIG. 4A filled with encapsulation, clean motor oil, and well fluid.
Figures 4C, 4D:
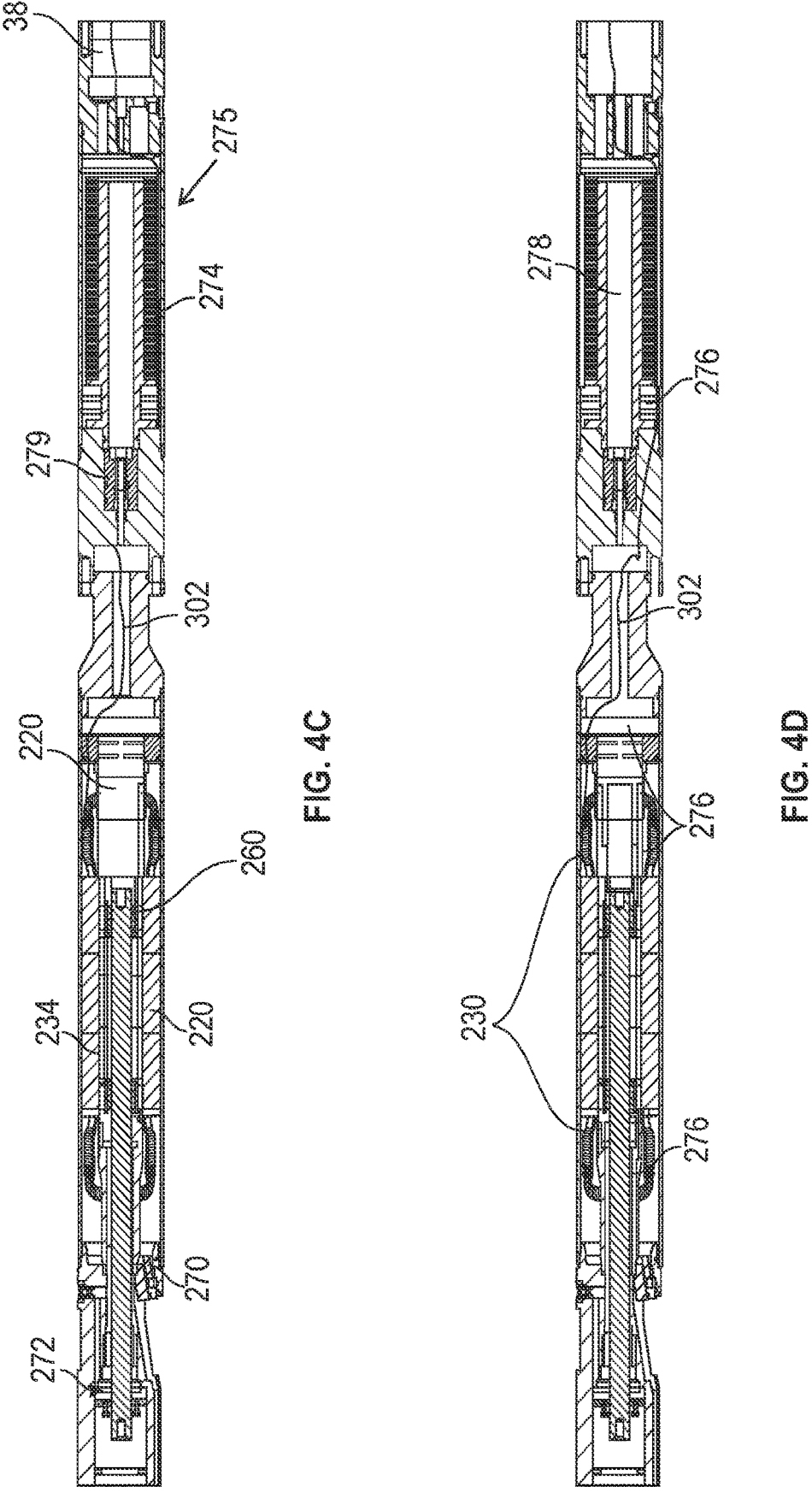
FIG. 4C shows a variation of an assembled canned motor.
FIG. 4D shows areas of the canned motor of FIG. 4C filled with encapsulation, oil, and well fluid.

The shaft-rotor sub-assembly 230 is inserted into a central bore or cavity 250 of the canned stator 200 to form a canned motor assembly as shown in FIGS. 4A and 4C. In some configurations, the rotor bearing key 268 is pre-aligned and/or engaged with the stator 200 and/or can 220 keyway 222 before or as the shaft-rotor sub-assembly 230 is inserted into the cavity 250 of the canned stator 200. Engagement of the rotor bearing key 268 with the stator keyway 222, as shown in FIG. 6, provides an anti-rotation force and/or function for the rotor bearings 260. A canned stator according to the present disclosure can include various numbers of rotor bearing keys 268, for example two as shown, or more than two to increase the rotor bearing 260 mounting and retention if desired or required.

As canned stators according to the present disclosure include intermediate rotor bearings 260 that engage the stator keyway 222, the can 220 and intermediate rotor bearings 260 are directly supported on the stator inner diameter. In contrast, some existing canned motor architectures only include bearings 260 at the ends of the rotor, outside of the canned stator region. This can be a problem, particularly at high horsepower in oil wells, as the aspect ratio becomes too long for only top and bottom bearings 260. Enabling intermediate bearings 260 provides greater support, for example at higher horsepower and/or speed. Forming keyways 222 in the can 220 to follow keyways in the stator ID advantageously simplifies the assembly process and the number of intermediate parts, especially when manufacturing and assembling multiple motor sections. All of the motor sections can share the same shaft 232, winding, can 220, and stator, eliminating the need for any tandem or intermediate connection between sections.

Figure 9:
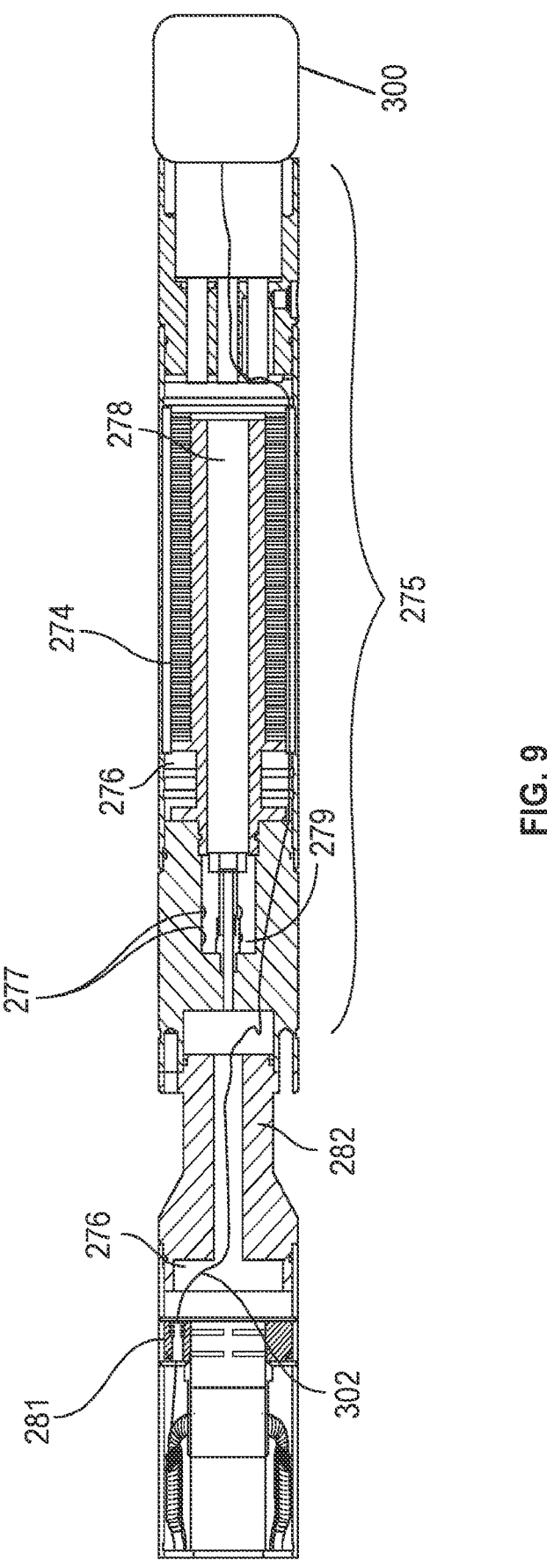
FIG. 9 shows the canned motor of FIG. 4D coupled to a downhole gauge.

Various volumes or areas within the canned motor can be at least partially or fully filled or occupied by different materials or fluids. For example, as shown in FIGS. 4B and 4D, an encapsulation zone between the housing 211 and can 220 of the stator can be filled with encapsulation material 230. The encapsulation material 230 can fully fill in all gaps, for example, in the laminations 214, windings, pothead terminal, and/or lead wires. A dielectric oil zone, for example, in a mechanical gap between the stator can 220 and rotor 230, the volume within the head 270, at the area of the thrust bearing 272, and/or outside of a compensation bellow 274 at the bottom of the motor (if included), can be filled with dielectric oil 276. A well fluid zone inside the compensation bellow 274 can be filled with well fluid 278 and can advantageously allow for expansion and contraction of the motor oil 276. In some configurations, for example as shown in FIGS. 4C-4D, the compensation bellow 274 is disposed in a compensation unit 275 coupled to the remainder of the stator via a motor base 282. As shown in FIG. 9, the compensation unit 275 includes communication ports 277 that are open to the well bore, allowing well fluid to enter the inner bellow region and provide pressure equalization between the ESP motor and the wellbore. The bellow 274 is sealed, so the well fluid does not breach into the dielectric oil region. The compensation unit 275 can also include a pressure relief valve 279.

As also shown in FIGS. 4B, 4D, and 9, gauge connection and/or thermo couple wires 302 are disposed in the clean oil zone and are routed from the motor through the motor base 282 into an optional downhole gauge 300, which can be used for measurement of pressure, temperature, vibration, etc. In some configurations, for example as shown in FIG. 9, the stator 200 includes a bottom spacer 280, which may comprise, be part of, or work with the sealing mechanism to prevent fluid entry into the lamination stack 212. The sealing mechanism, for example, the spacer 280, includes one or more sealed ports 281 through which the wires 302 extend. The sealed ports ensure the clean dielectric oil does not enter the encapsulation zone and mix with the encapsulation material, while allowing the wires 302 to be sealed and routed through the motor base 282 to the compensator unit 275. Inside the compensator unit 275, the wires 302 are routed along the outer diameter of the bellow 274, and therefore immersed in dielectric oil, to the downhole gauge 300.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A motor for a submersible pumping system, the motor comprising:
  a housing;
  a canned stator comprising:
    a lamination stack and stator windings, the lamination stack including:
      a central bore defined by an inner surface; and
      a lamination stack keyway disposed in the inner surface of the lamination stack; and
    a can including:
      an outer surface; and
      an inner surface defining a bore, wherein the can is disposed within the central bore of the lamination stack and is disposed adjacent to the inner surface of the lamination stack, and wherein the inner surface of the can comprises at least one can keyway radially aligned with the lamination stack keyway; and
  a shaft and rotor sub-assembly comprising:
    at least one rotor bearing including:
      a rotor bearing carrier including:
        an outer surface; and
        an inner surface defining a carrier bore, wherein the rotor bearing carrier is disposed within the bore of the can, and wherein the rotor bearing carrier includes a rotor bearing key disposed in a recess in the outer surface of the rotor bearing carrier, and wherein the rotor bearing key disposed in the can keyway;
      a rotor bearing bushing including an inner surface defining a bushing bore, the rotor bearing bushing is disposed within the carrier bore, wherein the rotor bearing bushing includes a bushing anti-rotation key configured to rotationally fix the rotor bearing bushing to the carrier; and
      a bearing sleeve including an inner surface defining a sleeve bore, wherein the bearing sleeve is disposed within the bushing bore; and
    a shaft disposed within the sleeve bore, wherein the shaft is keyed to the bearing sleeve by a shaft key.

2. The motor of claim 1, further comprising encapsulation material disposed between the housing and the can.

3. The motor of claim 1, wherein the at least one rotor bearing comprises an upper rotor bearing disposed proximate an upper end of the lamination stack, a lower rotor bearing disposed proximate a lower end of the lamination stack, and at least one intermediate rotor bearing disposed between the upper rotor bearing and the lower rotor bearing.

4. The motor of claim 1, the canned stator further comprising a sealing mechanism at each axial end of the can, the sealing mechanism configured to prevent fluid entry into the lamination stack.

5. The motor of claim 4, the sealing mechanism comprising at least one port configured to allow wires from the motor to extend therethrough for external connections.

6. The motor of claim 4, the sealing mechanism comprising one or more of welding, adhesive, elastomeric sealing elements, or metallic sealing elements.

7. The motor of claim 1, further comprising a compensator unit coupled to the motor, the compensator unit comprising a compensation bellow.

8. The motor of claim 7, wherein wires extend from the motor, within the compensator unit along an outer diameter of the compensation bellow, to a downhole gauge.

9. The motor for a submersible pumping system of claim 1, wherein the outer surface of the can includes a first outer diameter at a first end and a second outer diameter at a second end, wherein the second outer diameter is larger than the first outer diameter.

10. A method of manufacturing a motor for a submersible pumping system, the method comprising:

inserting a can into a central bore of a stator, wherein:

the stator comprising a lamination stack disposed within a housing;

the lamination stack includes an inner surface and a lamination stack keyway disposed in the inner surface of the lamination stack;

the inner surface of the lamination stack defines the central bore of the stator;

the can includes:

an outer surface; and an inner surface defining a bore;

the inner surface of the can having a can keyway; and inserting the can into the central bore of the stator includes radially aligning the lamination stack keyway with the can keyway; and inserting a shaft and rotor sub-assembly into a central bore of the can, the shaft and rotor sub-assembly comprising at least one rotor disposed about the shaft and at least one rotor bearing disposed about the shaft, the at least one rotor bearing comprising:

a rotor bearing carrier including an outer surface and an inner surface defining a carrier bore, the rotor bearing carrier disposed within the bore of the can, the rotor bearing carrier including a rotor bearing key disposed in a recess in the outer surface of the rotor bearing carrier, the rotor bearing key disposed in the can keyway;

a rotor bearing bushing including an inner surface defining a bushing bore, the rotor bearing bushing disposed within the carrier bore, the rotor bearing bushing including a bushing anti-rotation key configured to rotationally fix the rotor bearing bushing to the carrier; and a bearing sleeve including an inner surface defining a sleeve bore, the bearing sleeve disposed within the bushing bore, wherein the shaft is disposed within the sleeve bore and adjacent to the inner surface of the bearing sleeve, wherein the shaft is keyed to the bearing sleeve by a shaft key.

11. The method of claim 10, further comprising sealing interfaces between an outer diameter of the lamination stack and an inner diameter of the housing and between an inner diameter of the lamination stack and an outer diameter of the can.

12. The method of claim 10, further comprising passing wires from the motor, through a sealing mechanism at or near a bottom of the motor, to extend to a downhole gauge.

13. The method of claim 10, further comprising at least partially filling a space between the housing and the can with encapsulation material.

14. The method of claim 10, further comprising preforming the can keyway prior to assembly with the lamination stack and the housing.

15. The method of claim 10, further comprising hydroforming the can keyway after inserting the can into the central bore of the stator.

16. The method of claim 10, the at least one rotor bearing comprising an upper rotor bearing disposed proximate an upper end of the lamination stack, a lower rotor bearing disposed proximate a lower end of the lamination stack, and at least one intermediate rotor bearing disposed between the upper and lower rotor bearings.

17. The method of claim 10, further comprising coupling a compensator unit to the motor, the compensator unit comprising a compensation bellow.

18. The method of claim 17, further comprising filling an area outside the bellow with dielectric oil.

19. The method of claim 17, further comprising routing wires from the motor, within the compensator unit along an outer diameter of the bellow, to a downhole gauge.

20. The method of claim 17, wherein the compensator unit comprises communication ports open to a wellbore, allowing well fluid to enter an area inside the bellow to provide pressure equalization between the motor and the wellbore.

21. The method of claim 10, wherein the outer surface of the can includes a first outer diameter at a first end and a second outer diameter at a second end, wherein the second outer diameter is larger than the first outer diameter.

* * * * *